Sept. 6, 1960  C. H. STEUBER ET AL  2,951,433
FRANKFURTER COOKERS
Filed Dec. 2, 1957
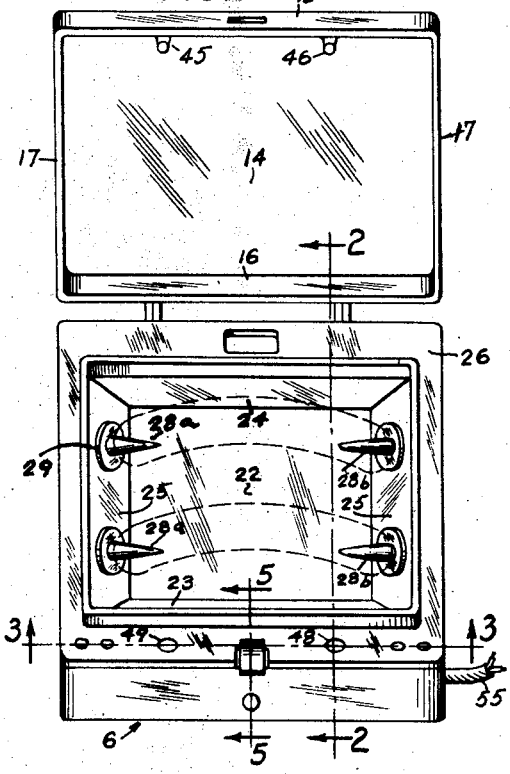
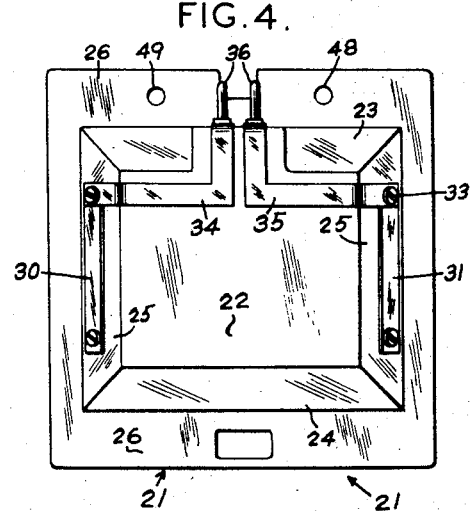
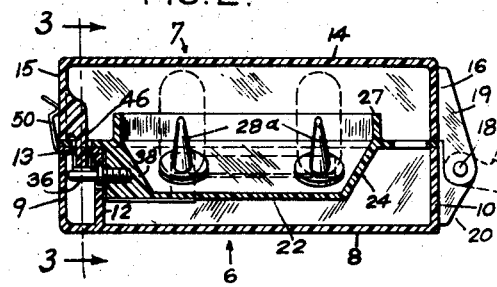
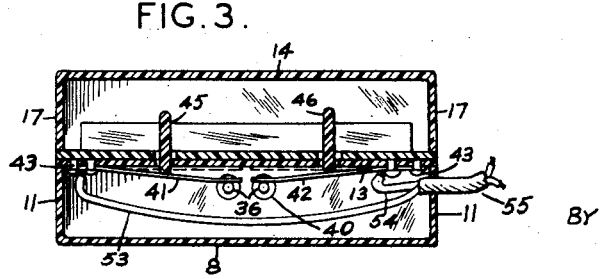
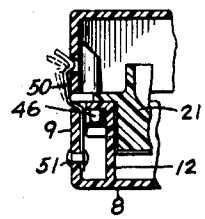
INVENTORS
CHARLES H. STEUBER
MORTON S. GOTTLIEB
BY Lawrence H. Cohn
Frank B Powell
ATTORNEYS

United States Patent Office 2,951,433
Patented Sept. 6, 1960

2,951,433

FRANKFURTER COOKERS

Charles H. Steuber, Kirkwood, and Morton S. Gottlieb, University City, Mo., assignors, by mesne assignments, to Hodges Research and Development Company, New York, N.Y., a corporation of California Filed Dec. 2, 1957, Ser. No. 700,024

1 Claim. (Cl. 99—337)

The present invention relates to electrical utensils for cooking frankfurters. Its principal object is to provide an improved device for quickly and conveniently cooking frankfurters by passing current directly through them, from end to end.

Other important objects of the present invention are directed to constructional features conducive to sanitation, safety, convenience of use, and economy in manufacture.

To that end our invention comprises a frankfurter cooking device including a housing structure which encloses the frankfurters during the cooking interval and prevents the user from coming in contact with electrical parts while they are energized. A tray removably mounted within the housing carries electrodes which hold and pass current into the "franks," and for catching any drippings therefrom. Improved safety provisions cause all current carrying parts to be deenergized when the casing is opened.

The foregoing and other objects and advantages will be hereinafter described with greater particularity, reference being made to the accompanying drawing showing a practical embodiment of the invention, and wherein:

Fig. 1 is a plan view of the cooker with the housing lid in raised or open position and the removable tray mounted within the base part of the housing;

Fig. 2 is a sectional elevational view taken at line 2—2, of Fig. 1;

Fig. 3 is a sectional elevational view taken at the plane indicated by lines 3—3, in Figs. 1 and 2;

Fig. 4 is a bottom plan view of the removable tray; and

Fig. 5 is a fragmentary sectional view taken at 5—5, of Fig. 1.

The body parts of the utensil, including the housing and the removable tray are desirably formed by molding procedures, with the use of a suitable thermo-setting plastic which is durable and capable of withstanding relatively high temperatures without injury. The housing includes a base part 6 and a complementary lid or closure member 7. The housing base 6 includes a bottom wall 8, upstanding front and rear walls 9 and 10, respectively, and side walls 11. The base is further provided with a partition wall 12 (Fig. 2) extending parallel to the front wall 9 between the side walls 11. An elongated chamber 12 defined between the front wall 9 and partition 12 affords a compartment for electrical connections and switching means to be hereinafter described. The interior of compartment 12 is made inaccessible by the horizontal top plate 13.

The hinged housing cover 7 includes a horizontal top plate 14, front and rear walls 15 and 16, respectively, and side walls 17. The base and cover parts 6 and 7 are hinged together by a pin 18 that extends through the hinged parts 19 and 20 formed integrally with the back of the rear walls 16 and 10 of the cover and base parts respectively.

The removable cooking tray is designated generally at 21. This member consists of a relatively shallow receptacle having a bottom 22, upwardly and outwardly sloping front, rear, and side wall portions 23, 24 and 25. At the upper edges of these inclined wall portions there is provided a flat horizontal, outwardly projecting flange 26, extending on all four sides of the tray. Flange 26 is adapted to seat upon the upper side wall edges of the base part 6, as shown in Fig. 2. A flange or rim 27 surrounds the central cavity of the tray and rises above the plane of the flange 26, such rim constituting a vertical continuation of the sloping wall parts 23, 24 and 25 of the tray.

Mounted on the sloping side portions 25 of the tray are pairs of opposed electrodes 28a and 28b. These are formed of copper or other good conducting metal and are characterized by conical prongs having pointed ends for easy penetration of the frankfurter, and include base collars 29. Rear parts (not shown) of the electrodes pass through suitable apertures in the inclined walls 25. Electrodes 28a are connected to conductor strips 30, secured thereto by screws 33, and similarly, electrodes 28b are connected to conductor strip 31. As will appear, conductor strips 30 and 31 are mounted upon the under surfaces of the sloping sides 25 of the tray. Conductors 34 and 35 are connected to the strips 30 and 31 respectively, and are joined to forwardly projecting terminal prongs 36, Fig. 4. Rear portions of the terminal prongs 36 are embedded in the thickened section 38, Fig. 2, at the front of the tray.

When the tray is properly mounted within the housing of the unit, as shown in Fig. 2, the terminal prongs 36 project into the switch compartment 12 through openings 40 formed in the partition wall 12. When so positioned terminals 36 constitute the fixed contact members of switching means whose movable members 41 and 42 consist of resilient metal strips. These strips are anchored at their outer ends to the top plate 13 by rivets 43. Normally they assume substantially horizontal positions adjacent the under surface of the top plate 13, wherein their inner ends are spaced above the terminal prongs 36. The strips 41 and 42 are adapted to be depressed into contact with the terminal prongs 36, as shown in Fig. 3, by the downwardly projecting fingers 45 and 46 on the front wall 15 of housing cover 7. Openings 48 and 49 in the front portion of the tray flange 26 register with corresponding openings in the top plate 13 of switch compartment 12, when the tray is positioned in the housing structure, as shown in Fig. 2. These pairs of aligned openings overlie the spring strips 41 and 42, and provide a passage for the fingers 45 and 46 when the cover is moved to closed position.

As will be understood, closing movement of the cover causes the fingers 45 and 46 to pass into the switch compartment, and to bear downwardly upon the spring strips 41 and 42, and depress them into contacting engagement with the terminal prongs 36. The opposite or opening movement of cover 7 allows the spring strips 41 to resume their normal switch open position, breaking the electrical circuit to the terminal prongs 36.

The spring strips 41 and 42 exert a constant upward force on the switch fingers 45 and 46 when the cover is closed, and latch means are provided to hold the cover member in closed position, against the upward force exerted thereon by the spring strips. Thus, a spring catch 50, secured at its lower end by rivet 51 to the front wall 9 of the housing base projects upwardly and is adapted to engage a recess or shoulder on the cover member, as best appears from Fig. 5. Outward movement of the spring catch 50 releases the cover member which then will be displaced upwardly a small distance by the action of the switch springs 41 and 42 in their movement to switch open position. The housing cover may be allowed to remain in this position to retain the heat in the housing, or may be swung rearwardly to permit the "franks" to be removed, with or without the tray. The switch parts 41 and 42 are connected to conductors 53 and 54 of an electrical supply cord 55.

From the foregoing description it will be understood that when the opposed electrodes are bridged by a frankfurter and the housing cover fully closed and latched a circuit is completed for the passage of current through the frankfurters which, because of their inherent resistance, are caused quickly to heat to cooking temperature. Opening of the housing lid immediately disconnects the electrodes from the voltage source, so that the "franks" and the electrodes may be safely contacted. The tray is readily removable from the housing to facilitate removal of grease, or meat particles. When so removed it may be washed in the manner of any other cooking utensil. All electrical parts of the housing remain concealed and protected.

Whereas our invention has been described with reference to a single practical embodiment, it will be understood that the invention is not so limited, and that certain changes may be made in the described device without departing from the invention.

We claim:

In a frankfurter cooker, a housing comprising a hollow base and a cover hinged thereto, a removable tray in said housing, spaced electrodes projecting upwardly and inwardly toward one another on said tray, means forming a compartment in said base, switch means in said compartment including a resilient metal strip, a terminal element mounted on said tray electrically connected to certain of said electrodes and projecting into said compartment and normally spaced from said resilient metal strip, said resilient metal strip extending transversely of and overlying said terminal element, means on said cover adapted to depress said resilient metal strip into contact with said terminal element coordinately with downward closure movement of said cover, and latch means for holding said cover in closed position against the upward biasing force of said resilient metal strip thereon.

References Cited in the file of this patent
UNITED STATES PATENTS

| | | |
|---|---|---|
| 2,007,260 | Smith | July 9, 1935 |
| 2,052,919 | Brogdon | Sept. 1, 1936 |
| 2,083,717 | Kohn | June 15, 1937 |
| 2,269,178 | Breneman | Jan. 6, 1942 |
| 2,344,373 | Stainbrook | Mar. 14, 1944 |